US012257739B2

(12) United States Patent
Galletti et al.

(10) Patent No.: US 12,257,739 B2
(45) Date of Patent: Mar. 25, 2025

(54) METHOD TO CONTROL A MIXER AND CORRESPONDING MIXER

(71) Applicant: OFFICINE MECCANICHE GALLETTI O.M.G. S.R.L., Perugia (IT)

(72) Inventors: Luca Galletti, Perugia (IT); Marco Nicoziani, Perugia (IT)

(73) Assignee: OFFICINE MECCANICHE GALLETTI O.M.G. S.R.L., Perugia (IT)

( * ) Notice: Subject to any disclaimer, the term of this patent is extended or adjusted under 35 U.S.C. 154(b) by 889 days.

(21) Appl. No.: 17/298,014

(22) PCT Filed: Nov. 27, 2018

(86) PCT No.: PCT/IT2018/000152

§ 371 (c)(1),
(2) Date: May 27, 2021

(87) PCT Pub. No.: WO2020/110157

PCT Pub. Date: Jun. 4, 2020

(65) Prior Publication Data

US 2022/0088827 A1 Mar. 24, 2022

(51) Int. Cl.

*B28C 7/02* (2006.01)
*B01F 27/701* (2022.01)

(Continued)

(52) U.S. Cl.

CPC ............ *B28C 7/026* (2013.01); *B01F 27/701* (2022.01); *B01F 35/212* (2022.01); *B28C 5/003* (2013.01);

(Continued)

(58) Field of Classification Search

CPC ....... B28C 7/026; B28C 5/003; B28C 5/0806; B01F 27/701; B01F 35/212; B01F 2101/28

See application file for complete search history.

(56) References Cited

U.S. PATENT DOCUMENTS 4,318,177 A 3/1982 Rapp et al.
5,537,028 A * 7/1996 Goodwin .............. G01R 21/08 324/141

(Continued)

FOREIGN PATENT DOCUMENTS

DE 10 2004 014340 A1 10/2005
EP 0305574 A1 * 2/1991 ............. B28C 7/026
EP 2165815 A1 3/2010

OTHER PUBLICATIONS

International Search Report and Written Opinion for PCT/IT2018/000152, mailed Aug. 12, 2019.

*Primary Examiner* — Michael W Choi

(74) *Attorney, Agent, or Firm* — MARSHALL, GERSTEIN & BORUN LLP

(57) ABSTRACT

A method to control a mixer includes an input to a control and command unit including a plurality of input data correlated to a formulation of a mix, a detection step to detect the values of an electric quantity characteristic of the electric power line of a drive unit in the mixer, a processing step where data is processed to calculate the overall active power, and to carry out verifications, comparing the data processed with one or more of the respective data introduced among the input data, in order to transmit to a controller that commands the mixer, a consent signal to discharge the mix or an anomaly signal.

7 Claims, 3 Drawing Sheets

(51) Int. Cl.

| | |
|---|---|
| ***B01F 35/212*** | (2022.01) |
| ***B28C 5/00*** | (2006.01) |
| ***B28C 5/08*** | (2006.01) |
| *B01F 101/28* | (2022.01) |

(52) U.S. Cl.
CPC ........ *B28C 5/0806* (2013.01); *B01F 2101/28* (2022.01)

(56) References Cited

U.S. PATENT DOCUMENTS

| | | | | |
|---|---|---|---|---|
| 6,656,515 | B2 * | 12/2003 | Lowry .................. | B01F 35/212<br>426/549 |
| 2001/0048961 | A1 * | 12/2001 | Lowry .................. | B01F 35/212<br>426/519 |
| 2017/0080600 | A1 * | 3/2017 | Dickerman ............... | B60P 3/16 |

* cited by examiner

METHOD TO CONTROL A MIXER AND CORRESPONDING MIXER

FIELD OF THE INVENTION

The present invention relates to a control method of a mixer for concrete, mortar, powders, dry and semi-dry granulates, cement-based mixes or similar or comparable mixes or mixtures.

The present invention also concerns a mixer, for example of the type with horizontal axes, suitable to operate in accordance with said control method.

BACKGROUND OF THE INVENTION

In the construction sector, for a long time now, mixers for concrete, mortar, powders, dry and semi-dry granulates and similar conglomerate materials have been widely used, in order to prepare large volumes of such conglomerates, preferably intended to be loaded on truck-mounted concrete mixers, and then to be cast. Examples of mixers are described in the European patent applications EP-A-1.685.933, EP-A-2.146.795 and EP-A-2.146.796 in the name of the present Applicant.

Mixers with horizontal axis and vertical axis are known. In particular, traditional horizontal axis mixers used comprise a mixing tank inside which one or more rotatable transverse shafts operate, usually parallel and counter-rotating, to mix the mixes loaded in said tank.

Each of these rotatable transverse shafts supports a series of radial arms used to support respective mixing blades, which, during the rotation of the respective shafts, are able to effectively interfere with the mix to be mixed, repeatedly stirring and suitably amalgamating the components of the mix loaded into the tank.

Outside the mixing tank, drive units are mounted to make each of the mixing shafts rotate. According to some embodiments known in the state of the art, the drive unit is provided with an electric motor which makes the respective mixing shaft rotate, directly or by means of motion transmission devices of the type known in the state of the art.

The mixers known in the art can generally be equipped with ammeters and/or with wattmeters, intended respectively to measure the intensity of the electric current absorbed and the active electric power generated by the drive units mentioned above.

These instruments, of a known type and provided with standard characteristics, then transmit the values detected to the control unit of the mixer, to enable the latter to emit alarm signals indicative of any dangerous situations. For example, an excessive absorption of electric current, or an excessive active electric power generated, can indicate that the drive units are not operating correctly and therefore it is necessary to activate the safety and protection devices with which the mixer is provided in compliance with the safety regulations in force, which—for example—stop the drive units and consequently interrupt the rotation of the mixing shafts.

In this sector there is a constant need to make robust and reliable mixers. Another necessity is to control the functioning of the mixer to obtain, after mixing, a high quality product, having the desired characteristics of consistency and homogeneity. Moreover, a deeply felt need in the sector is to optimize mixing times, to end the mixing cycle as soon as the product is ready, so as to save time and electric energy, with consequent significant savings on the operating costs of the mixer.

One purpose of the present invention is therefore to perfect a method to control a mixer for concrete, mortar, powders, dry and semi-dry granulates, cement-based mixes or similar or comparable mixes or mixtures, which overcomes the disadvantages that affect the functioning of known mixers, optimizing mixing times to obtain a mix having the desired characteristics of consistency and homogeneity.

Another purpose of the present invention is to perfect a feedback control method for a mixer which allows to signal to the operator possible corrective actions to be carried out on the basis of information detected or processed during the mixing cycle.

Another purpose of the present invention is to perfect a method to control a mixer that allows to increase the working life of the mixer, to have less wear on the components subjected to this phenomenon, so as to require less frequent maintenance interventions, and therefore less expensive.

Another purpose of the present invention is to perfect a method to control a mixer that allows to obtain indirect information about the state of the mixing tank, such as, by way of non-restrictive example, information about its state of cleanliness or maintenance, and information about its complete emptying.

Another purpose of the present invention is to provide a mixer able to implement the above control method, to overcome the disadvantages of mixers known in the state of the art.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a method is provided to control a mixer for concrete, mortar, powders, dry and semi-dry granulates, cement-based mixes or similar or comparable mixes or mixtures, which allows to overcome the limits of the state of the art and eliminate the defects therein.

According to the present invention, the control method provides an input step in which it provides to communicate to a control and command unit of the mixer a plurality of input data correlated to the particular formulation (that is the "recipe", in terms of components that make up the mix and relative quantities) of the mix that is to be treated in the mixing cycle, a detection step in which it provides to detect the values of an electric quantity characteristic of the electric power line of a drive unit comprised in the mixer.

According to some embodiments, the electric quantity detected is chosen from a group consisting of: electric current, voltage, active power and reactive power.

In one embodiment, the detection step provides to detect the electric current by means of Hall effect sensors.

According to one embodiment, the frequency of detection of the values of the electric quantity is very high, in particular equal to or higher than 5 or 10 times a second.

According to one embodiment, it is provided to detect a single electric quantity, for example the electric current, and determine the other quantities listed above in a subsequent processing step, as a function of the values of current detected.

According to a characteristic aspect of the present invention, the control method provides a processing step in which a control and command unit processes the data detected in the detection step in order to calculate the overall active power that is generated as a function of time, and to carry out one or more verifications, comparing the data processed with one or more of the respective data introduced among the input data, in order to transmit to a programmable logic controller that commands the functioning of the mixer alternately a consent signal to discharge the mix subjected to the mixing cycle, or an anomaly signal selectively correlated to the verification or verifications that have had a negative outcome, so that the operator can respectively command in the first case the discharge of the mix from the mixer, and in the second case the consequent corrective actions on the mixing cycle.

According to one embodiment, the processing step provides to graphically reconstruct a first curve, also called load curve, which shows the development of the average values calculated of the overall active power as a function of time. According to one embodiment, the processing step provides to graphically reconstruct a second curve, whose development substantially follows that of the first curve but has an oscillating development characterized by a succession of peaks and hollows, and which shows the development of the values calculated, instant by instant, of the overall active power as a function of time, net of the average value.

In accordance with the teachings of the present invention, the first curve is directly correlated to the consistency of the mix subjected to the mixing cycle; and in one embodiment the processing step provides to compare the values of the average overall active power with a predetermined threshold value (introduced among the input data), below which it is deemed that the consistency of the mix is adequate.

Moreover, according to the present invention, the second curve is directly correlated to the homogeneity of the mix subjected to the mixing cycle. In a particular embodiment, the processing step provides to calculate the distance, measured parallel to the y axis, between each oscillation peak and the subsequent hollow, and subsequently to compare this distance with a predetermined distance value that functions as a threshold value (introduced among the input data) below which it is deemed that the homogeneity of the mix is adequate.

In one embodiment, the method according to the present invention provides that the control and command unit sends to the programmable logic controller the signal to consent to the discharge as soon as both the values of consistency and homogeneity are lower than the respective thresholds.

According to embodiments provided here, the processing step also provides to verify the conditions of a mixing tank comprised in the mixer in order to verify, in particular, whether it was not completely emptied during the previous mixing cycle, or if it has to be cleaned or maintained, or if it has been loaded with an excessive amount of material. In these embodiments, it is provided to identify the conditions listed above of the mixing tank by comparing the average values of active power calculated, in particular in determinate portions of the mixing cycle, with suitable threshold values of the power, introduced among the input data. Typically, if the average active power exceeds the threshold values, it provides to communicate an anomaly signal to the programmable logic controller to carry out the necessary corrective cleaning or maintenance operations of the mixing tank, or to discharge the excess amount of material.

According to some embodiments of the present invention, the processing step also provides to compare the development of the first curve with a reference model curve, introduced among the input data, and directly correlated to the particular formulation of the mix being worked, in order to verify that it always remains comprised inside a tolerance band delimited above by a first line and below by a second line, whose shape is determined by reference coordinates introduced among the input data. In one embodiment, the processing step also provides to verify if after a determinate instant the first curve always maintains a decreasing monotonic development. According to these embodiments, if the first curve departs from the tolerance band, or does not have the decreasing monotonic development provided after said determinate instant, the control and command unit communicates an anomaly signal to the programmable logic controller.

According to some embodiments, the control and command unit communicates to the programmable logic controller the signal to consent to the discharge only after having verified that all the verifications described above have had a positive outcome. If even only one of the verifications carried out has a negative outcome, the signal to allow the discharge is not transmitted, but instead an anomaly signal is sent to the programmable logic controller and corresponding to the verification that has not been passed.

According to another aspect of the present invention, a mixer is provided comprising a plurality of rotatable shafts for mixing the mix inside a mixing tank, and at least one drive unit to make the rotatable shafts rotate; wherein the mixer also comprises a control and command unit which communicates with a programmable logic controller of the mixer in order to carry out a control method in accordance with the present invention, and wherein the programmable logic controller is configured to command inverters associated with the drive unit to regulate and control the functioning thereof.

The present invention advantageously allows to optimize the duration of a mixing cycle, signaling its end as soon as the mix has the desired characteristics of consistency and homogeneity.

Consequently, the present invention renders the functioning of the mixer very flexible since the mixing cycles last the necessary time, and do not have a duration pre-set in advance on the basis of the formulation of the mix to be mixed, as happens instead in solutions in the state of the art. It should be noted that the flexibility of the present invention advantageously allows to also delay the discharge of the mix, even if it is already ready, maintaining a bland mixing that allows the mix to remain well amalgamated, without it being subjected to a superfluous over-mixing, which could alter its state and would be expensive in terms of energy consumption and wear of some components of the mixer.

This advantageously allows to reduce the times of the mixing cycle and/or to guarantee that the mix is discharged only when it has reached the desired characteristics in terms of consistency and homogeneity.

Moreover, the control method of the present invention is also very reliable and allows to reduce maintenance operations to a minimum, which are performed only when they are actually necessary.

The present invention also allows to extend the useful life of the mixer and/or many of its components which, thanks to the control method described here, are not overloaded or are subjected to a less rapid wear.

Some versions of the present invention advantageously allow to optimize the mixing cycle according to environmental conditions, for example temperature or humidity, outside and/or inside the mixing tank.

According to some embodiments, the present invention advantageously provides a control method able to self-learn, according to machine learning techniques, the behavior of the previous mixing cycles, in which the same formulation was treated, so as to automatically update the input data, such as the threshold values mentioned above, to further refine the optimization of the mixing cycle.

According to the embodiments provided here, the method to control the mixer according to the present invention can advantageously be carried out to control a mixer suitable to be integrated on an existing line or working plant, without requiring particular adaptations. The control method according to the present invention is configured to control mixers in the field of modular and scalable systems, in which additional devices or apparatuses can be added, upstream and downstream of the mixer and operatively connected with the latter, without this implying long and laborious adaptation operations.

BRIEF DESCRIPTION OF THE DRAWINGS

These and other characteristics of the present invention will become apparent from the following description of a preferential form of embodiment, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
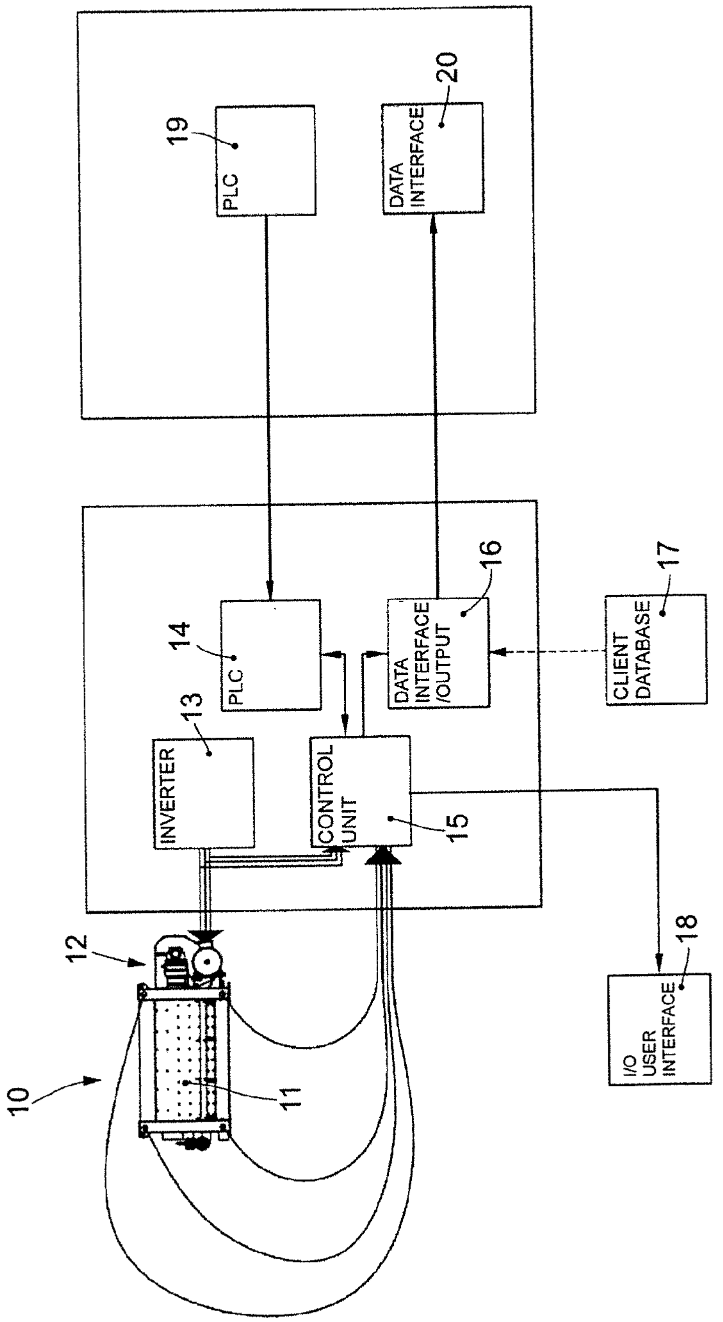
FIG. 1 is a descriptive block diagram of the control logic of a mixer according to embodiments described here.

FIG. 1 diagrammatically shows a mixer 10, for example of the type with horizontal axes, controlled by a method in accordance with the teachings of the present invention. The mixer 10 discussed here comprises a plurality of rotatable shafts (not shown) to mix the mix to be amalgamated, which are disposed inside a mixing tank 11 suitable to contain the mix to be mixed. Each rotatable shaft is provided with a plurality of mixing blades, for example shaped, not shown either, which effectively interfere with the mix to be amalgamated, to mix it and amalgamate it.

The mixing tank 11 can also be configured to allow to discharge the prepared mix from the bottom due to gravity, usually into a conveying hopper.

In some embodiments, the mixer 10 can comprise one or more drive units 12, each comprising a respective motor, such as an electric motor, to make the rotatable shafts rotate. For example, as many drive units 12 can be provided as there are rotatable shafts to be driven. Or a single drive unit 12 can be provided, configured to drive all the rotatable shafts with which the mixer 10 is provided.

In some embodiments, the mixer 10 can comprise an inverter 13, of a type known in the state of the art, which allows to regulate the characteristic parameters of the electric power supply current of the drive unit 12, so as to modify the operating conditions thereof.

According to some embodiments, the mixer 10 comprises a programmable logic controller (or PLC), whose block is indicated by the reference number 14 in FIG. 1, and whose function will be described in more detail later in the context of the detailed description of embodiments of the control method according to the present invention.

According to some embodiments, the mixer 10 also comprises a control and command unit 15, suitably designed and programmed to implement the method according to the present invention. In one embodiment, the control and command unit 15 can comprise an electronic board provided with a plurality of on-off outputs to communicate signals to the programmable logic controller 14, and a plurality of inputs to receive the input data.

According to some embodiments described here, the control and command unit 15 communicates, by means of a data interface 16, with an external database 17, for example containing at least the information relating to the composition of the mix to be mixed.

Furthermore, in some embodiments, the control and command unit 15 is connected to a user interface 18, by means of which the operator can display the parameters and the characteristic information of the mixing process that the mixer 10 is performing. In one embodiment, the user interface 18 comprises an electronic device, for example a computer, fixed or portable, or a tablet, provided with a display, for example of a touch-sensitive type, which allows the operator to display the parameters and data.

It should be noted that the programmable logic controller 14 and the data interface 16 are configured to communicate respectively with a homologous controller 19 and a corresponding data interface 20, outside the mixer 10, for example provided in the plant in which it is located.

Figure 2:
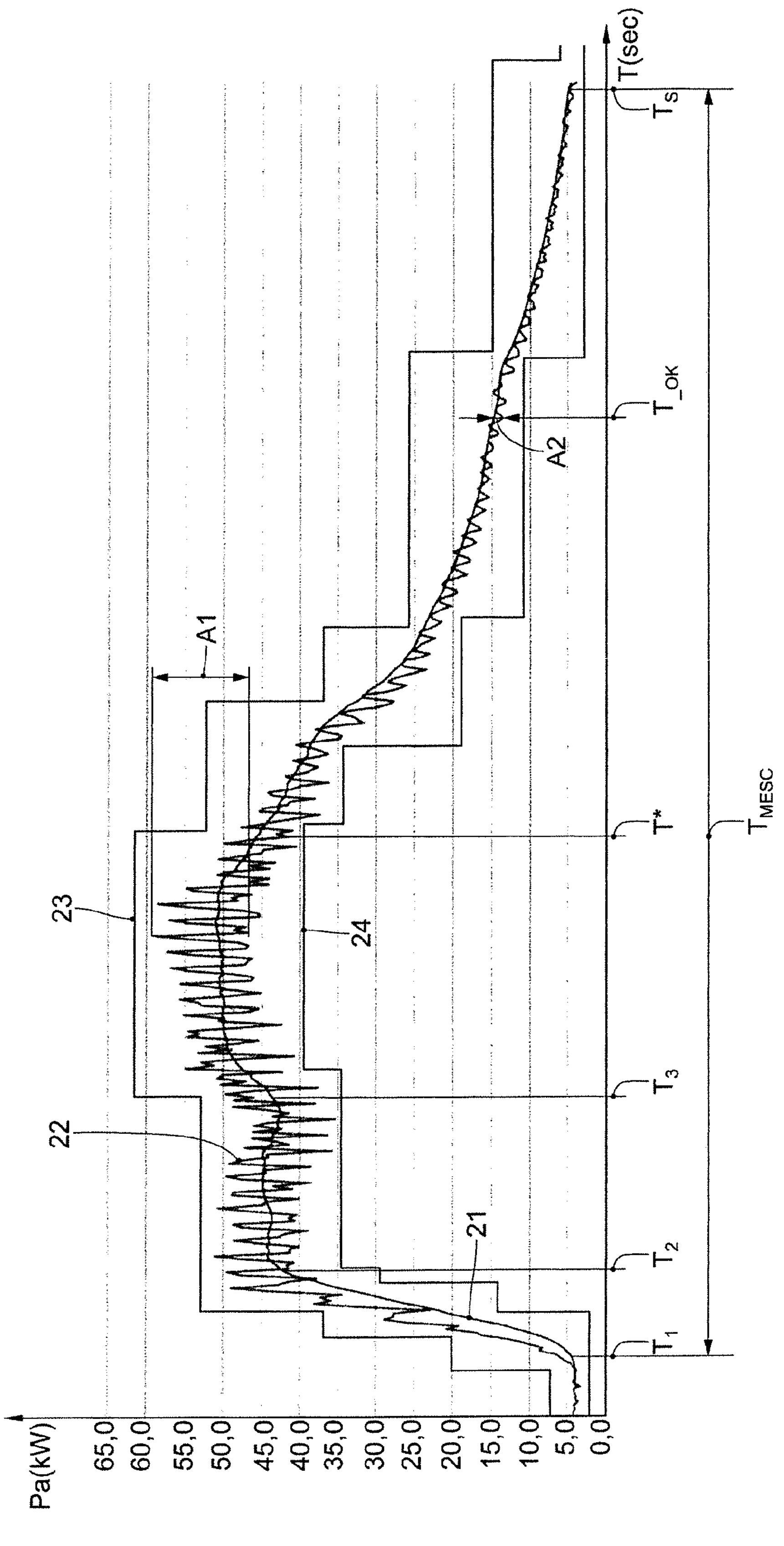
FIG. 2 is a graph of the active power as a function of time, absorbed by drive units comprised in a mixer that is controlled by a method according to the present invention.

FIG. 2 shows a graph showing an example of the development of the active power absorbed by the drive unit 12 as a function of time. The curve shown in the graph is also called the "load curve" and is a function of the composition of the set of materials, or "recipe", which was introduced into the mixing tank 11. In other words, each "recipe" is characterized by its own load curve.

Typically, in this field, all the load curves provide some steps, temporally staggered with respect to one another, in which it is provided to introduce the components to be mixed into the mixing tank 11. In a typical example, it is first intended to introduce inert materials (that is, raw granular mineral materials such as sand, gravel, etc.), then the cement, and finally water or other liquid. In some cases, it is also provided to introduce one or more additives, commonly used in the building trade, such as suitable thickeners of a known type.

The relative proportions—expressed by weight—between the different components of the formulation that must be subjected to the mixing cycle change according to the product to be obtained.

In the building trade, it is known to introduce numerous different "recipes" into the mixing tank 11, which typically distinguish the different products made by different operators in the field, who can each formulate their own formulations to obtain the respective products.

The load curve changes according to the formulation because it is determined by the chemical-physical conditions of the mix that is being mixed. In fact, since the active power generated by the drive unit 12 is shown in the load curve, the higher the resistance that the mix opposes to the mixing blades, the greater the active power generated will be. Thus, for example, the higher the component of solid-state materials inside the mixing tank 11, the higher the active power, and it gradually decreases as the mix is amalgamated with the liquid introduced (for example water), which makes the mix more pasty, to a semi-solid state.

The drawing shows a first curve 21, which depicts the average values of the active power calculated instant by instant, and a second curve 22, which instead graphically shows the development of the active power calculated on the basis of the measurements made. In other words, the second curve 22 is constructed by disposing on the graph all the active power values calculated over time. Since the sampling frequency is very high, as we will see in more detail hereafter in the present detailed description, the second curve 22 is substantially continuous.

In FIG. 2, by way of non-restrictive example, T1 indicates the instant in which the inert materials begin to be introduced into the mixing tank 11, T2 indicates the instant in which the cement is introduced, and T3 indicates the instant in which water is introduced. Furthermore, Ts indicates the instant when the discharge of the mix takes place from the mixing tank 11, and consequently the mixer 10 can be stopped. It should be noted that the time interval between instant T1 and instant Ts defines the mixing time Tmesc.

Moreover, in this same drawing a first line indicated by the reference number 23 is shown, and a second line indicated by the reference number 24. In one embodiment, shown in the drawing by way of example, the first line 23 has the same development as the second line 24, but is moved upward by a certain quantity along the y axis with respect to the second line 24. In accordance with some embodiments, the first line 23 and the second line 24 can be defined by broken lines, as shown for example in FIG. 2. According to a variant embodiment, not shown, the first line 23 and the second line 24 can have a substantially continuous development, that is, without discontinuity.

According to some embodiments, the first line 23 defines an upper limit for the curves 21, 22, while the second line 24 defines a lower limit for the curves 21, 22. In other words, the lines 23, 24 identify a tolerance band inside which the curves 21, 22 must always remain. Otherwise, as will be described in greater detail below, the control method according to the present invention detects a functioning anomaly, which is signaled to the operator.

Figure 3:
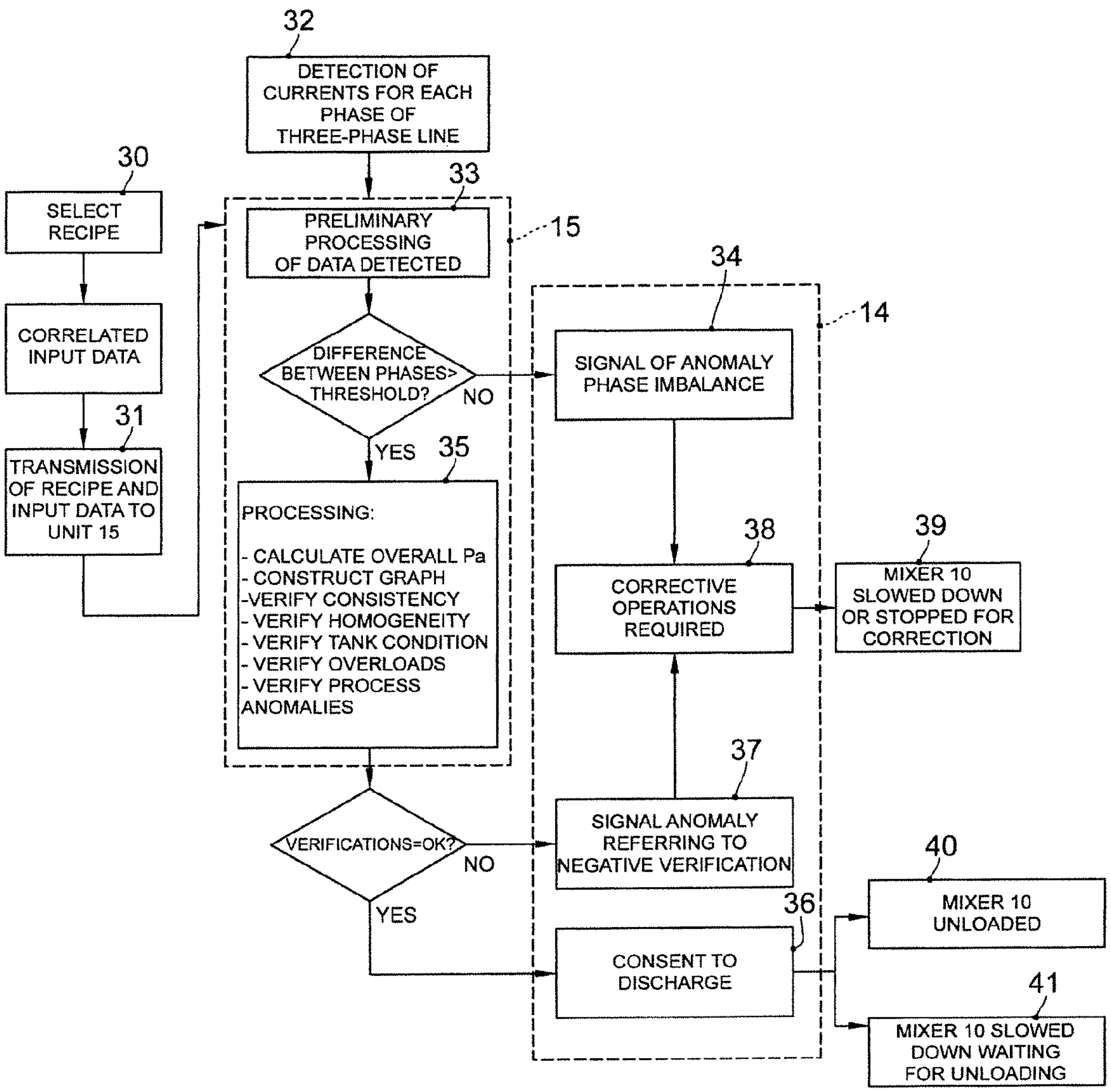
FIG. 3 is a block diagram showing one embodiment of a control method in accordance with the present invention.

With reference to FIG. 3, we will now describe in detail the steps of the control method for a mixer 10 according to the present invention.

In a first step (block 30), it is provided to select the "recipe" to be processed in the mixer 10, that is, the relative proportions, by weight, of the different components which will be introduced into the mixing tank 11 with respect to the total load to be introduced. In one embodiment, the "recipe" is memorized in the company database 17 and can be communicated to the control and command unit 15 by means of the data interface 16.

In a second step (block 31), it is provided to communicate to the control and command unit 15 both the selected "recipe" and a plurality of input data, which can also be memorized in the company database 17, and directly correlated to the selected "recipe".

The input data transmitted to the control and command unit 15 comprise at least one or more of those listed below:

- mixing time Tmesc;
- one or more threshold values of the maximum active power Pmax generated in the empty tank condition;
- threshold values characteristic of the first curve 21, which will be described in greater detail below;
- threshold values characteristic of the second curve 22, also described in greater detail below;
- development of lines 23, 24, for example in terms of Cartesian coordinates (Pa, T) of the points of discontinuity;
- a maximum active overload power, which must never be reached during the functioning of the mixer 10;
- maximum imbalance thresholds of the values of current, or voltage, or active power or reactive power, between the different phases of the three-phase electric power supply line of the mixer 10;
- possibly, a first curve 21 which acts as a "model" characteristic for each specific "recipe", as a term of comparison for the first curve 21 which the method according to the present invention provides to reconstruct on the basis of the average active power values calculated during the mixing cycle.

The maximum active overload power can be defined by an active reference curve, not to be exceeded at least in an initial transient period of the mixing cycle.

Subsequently, a detection step is provided (block 32), in which the control and command unit 15 receives a plurality of data detected on the drive unit 12 which powers the mixer 10.

In one embodiment, it is provided to detect the values of current of the three-phase line. According to embodiments provided here, the currents are measured with Hall effect sensors, of a type known in the state of the art.

In a preferred embodiment, the sampling frequency to detect the above values of current is very high, for example equal to or greater than 10 Hz. In other embodiments, the sampling frequency can be equal to or greater than 5 Hz.

Subsequently, the method according to the present invention provides a preliminary processing step of the data detected (block 33).

In the preliminary processing step, on the basis of the values of current and voltage measured for each of the three steps, corresponding values of active power and reactive power are calculated. This step provides to compare, instant by instant, the values of current detected, in order to highlight an imbalance of the values between the different steps.

In one embodiment, if the difference between homogeneous values (current, voltage or power) of one step compared to the others exceeds a certain imbalance threshold (which has been communicated to the control and management unit 15 among the input data), then the control and command unit 15 signals to the programmable logic controller 14 that an anomaly has occurred, so as to inform the operator (block 34). In particular, this preliminary processing step allows to signal to the programmable logic controller 14 in which step the imbalance has occurred, and with respect to which electrical quantity (current, voltage, active or reactive power). If the imbalance thresholds are never exceeded for any of the quantities monitored, for no step, the outcome of this preliminary processing step will be positive, and the control method signals to the programmable logic controller 14 that there are no imbalances and that it can proceed with the next step.

The next step is the actual processing step (block 35), which provides to calculate the total active power generated by the drive unit 12 which powers the mixer 10. It should be noted that these total active power values are different from those calculated previously in the preliminary processing step, which concerned the single phase of the three-phase line.

On the basis of the total active power values calculated in this step, it is possible to obtain a graph like the one shown in FIG. 2, in particular a first curve 21, a function of the average active power average values calculated, and a second curve 21 which allows to display the characteristic oscillatory development of the total active power values calculated over time.

In accordance with the method of the present invention, the processing step also provides to perform one or more of the further processings described in the following paragraphs.

In general, the result of the processing step is obtained by communicating an appropriate signal to the programmable logic controller 14. This signal can be the consent to unload the mixer 10 (block 36) if all the subsequent processing and verifications have been successful, or, in the opposite case, an anomaly signal, selectively referable to the verification/verifications that has/had a negative result (block 37). In this case, as will be described in more detail below, the programmable logic controller 14 signals to the operator that corrective operations are necessary (block 38), which for example can require to slow down or completely stop the mixer 10 (block 39).

Consistency.

The consistency of the mix worked by the mixer 10 is an index of its subsequent workability and can be measured by the so-called "slump test", as regulated by the regulatory bodies, which can be measured easily and quickly, directly on site, for example in the building site.

Tests and trials carried out by the Applicant have revealed a direct correlation between the development of the first curve 21 and the consistency of the mix being worked.

Consequently, the processing step provides to compare, instant by instant, the average total active power (first curve 21) with the characteristic values relating to the first curve 21 that have been communicated to the control and command unit 15 among the input data. In particular, these characteristic values comprise at least a predetermined threshold value below which it is deemed that the consistency of the mix is adequate. The processing step provides to memorize instant T_consist_ok starting from which the suitable consistency of the mix has been reached.

If instant T_consist_ok is temporally antecedent to Ts, then the control and command unit 15 signals to the programmable logic controller 14 that the desired consistency has been reached before the expected instant.

On the contrary, if instant T_consist_ok is temporally after Ts, then the control and command unit 15 signals to the programmable logic controller 14 that the desired consistency has not yet been reached. In this case, the operator is informed that the mixing cycle of the mixer 10 will have a duration equal to a mixing time higher than the predetermined one and memorized among the input data, and the discharge instant Ts will be delayed with respect to the expected times.

Homogeneity.

In this field, the homogeneity of the mix that has been mixed is also an important feature to ensure the subsequent workability of the mix.

Tests and trials carried out by the Applicant have shown a direct correlation between the development of the second curve 22 and the homogeneity of the mix being worked. In particular, the processing step provides to calculate the distance, measured parallel to the y axis, between each oscillation peak and the subsequent hollow. This distance is indicated in FIG. 2, at two different points of the curve, respectively with the references A1, A2.

The processing step then provides to compare, instant by instant, the distance calculated between each oscillation peak and the subsequent hollow, with the characteristic values relating to the second curve 22 that have been communicated to the control and command unit 15 among the input data. In particular, these characteristic values comprise at least a predetermined value of distance which acts as a threshold value below which it is deemed that the homogeneity of the mix is adequate. The processing step provides to memorize instant T_omog_ok starting from which the desired degree of homogenization of the mix has been reached.

If instant T_omog_ok is temporally antecedent to Ts, then the control and command unit 15 signals to the programmable logic controller 14 that the desired homogeneity has been reached before the expected instant.

On the contrary, if instant T_consist_ok is temporally after Ts, then the control and command unit 15 signals to the programmable logic controller 14 that the desired homogeneity has not yet been reached. In this case, the operator is informed that the mixing cycle of the mixer 10 will have a duration equal to a mixing time higher than the predetermined one and memorized among the input data, and the discharge instant Ts will be delayed with respect to the expected times.

Verification of the State of the Mixing Tank 11.

The processing step allows to verify the state of the mixing tank 11.

According to some embodiments of the control method provided here, the processing step provides to compare the values of average active power (first curve 21) with the maximum active power threshold value Pmax in the empty tank condition, which was communicated to the control and management unit 15 among the input data. In particular, it is provided to perform this comparison in the instants preceding the first instant T1, when the mixing tank 11 should be empty (before the introduction of the inert materials), and after the discharge instant Ts, when the mixing tank should again be empty, after having been emptied at the end of the mixing cycle.

In particular, if at these times the average active power is higher than the threshold value Pmax, this can mean that the mixing tank 11 is not effectively empty, and therefore a consequent signal is sent to the programmable electronic controller 14 to warn the operator.

According to one embodiment, two different maximum power thresholds are provided, respectively Pmax1 and Pmax2, the first one higher than the second. In this embodiment, the fact that the average active power is higher than Pmax1 indicates that the mixing tank 11 was not completely emptied at the end of the previous mixing cycle. Moreover, in this embodiment it is also provided to monitor the case where the average active power is lower than Pmax1, but higher than Pmax2. This case is indicative of the fact that the mixing tank 11 was completely emptied at the end of the previous mixing cycle, but over time has accumulated residues of materials and dirt such as to require extraordinary cleaning and/or maintenance operations on the mixing tank 11. If the average active power is lower than both thresholds, this means that no anomaly is detected regarding the state of the tank, and therefore the mixing cycle can continue regularly. In one embodiment, in the latter case too it can be provided that the control and command unit 15 communicates to the programmable logic controller 14 that the verification of the conditions of the mixing tank 11 has been successful.

It should be noted that thanks to the fact that the processing step allows to verify the condition of the tank, in particular according to the methods described above, the mixing tank 11 can advantageously have no weighing devices, such as load cells, which otherwise would be necessary to verify the presence of residual material inside the mixing tank 11, both before the introduction of the load and after it was discharged.

Protection from Overload.

If the average active power rises above a limit value, the control and command unit 15 communicates this to the programmable logic controller 14. This situation can be due, for example, to the fact that the mixing tank has been loaded with an excessive amount of material.

Evaluation of Anomalies in the Mixing Process.

In one embodiment, a comparison is made between the first curve 21 which is being constructed on the basis of the calculated values of average active power and the "model" load curve of the specific recipe being worked, which was acquired as a reference by the control and command unit 15 among the input data. In this embodiment, deviations exceeding a certain limit threshold with respect to the "model" curve trigger a signal to the programmable logic controller 14 that anomalies are occurring in the mixing process.

According to embodiments provided here, the processing step provides to verify, instant by instant, whether the first curve 21 remains inside the lines 23, 24 which were acquired by the control and command unit 15 among the input data. If it did not do so, for example for reasons explained by way of example below, the control and command unit 15 signals the anomaly to the programmable logic controller 14.

For example, if after the first instant T1 the first curve 21 does not rise significantly, with the expected growth gradient, the first curve 21 would pass the second line 24, generating the anomaly signal. This can be due to the fact that the expected quantity of inert materials has not been introduced into the tank, or that the inert materials have characteristics of a chemical-physical state different from those expected. By way of example, if the inert materials comprise a large quantity of clays with low viscosity, with a liquid component prevailing over the solid one, this could cause the above anomaly.

According to another example, if after a specific instant T*, after the third instant T3, the first curve 21 does not remain a decreasing monotonic one, but inverts the curvature and starts to rise, it would pass the first line 23, generating an anomaly signal. This could be due, for example, to the fact that less than the expected amount of water was introduced.

In both the above examples, the control method according to the present invention, by signaling the anomaly to the operator, allows a "dynamic" correction of the "recipe" which can be performed in advance with respect to the end of the mixing cycle, adding a certain component, in certain quantities, in order to return the load curve in adherence with the "model" curve. On the contrary, in the solutions known in the state of the art the operator would notice any anomalies only at the end of the cycle, and then either the mix would be discarded without being able to recover it, or it would be corrected in a subsequent mixing cycle. It is evident that, on the contrary, the control method according to the present invention allows to implement corrective actions of the "recipe" being worked during the mixing cycle, thus allowing to avoid working discards so as to reduce the environmental impact of the mixer, and also correct possible errors while the mixing cycle is being performed, with a consequent reduction in working times and costs.

The processing step therefore provides to carry out all the verifications described above.

In one embodiment, if the above verifications and comparisons are successful, at the end of the processing step the control and command unit 15 communicates to the programmable logic controller that at a certain instant T_ok the mixing cycle is terminated. This instant T_ok can be earlier or later than the predetermined discharge instant Ts. In the first case, the mixing cycle is terminated early and the mixing time is less than the expected time Tmesc. In the other case, the mixing cycle is prolonged with respect to the expected time and the mixing time Tmesc is greater than the preset value.

In one embodiment, instant T_ok can be defined as that instant when the control unit 15 communicates its consent to discharge the mix to the programmable logic controller 14.

According to embodiments described here, in order to identify an instant T_ok, the mix being mixed must have reached the desired consistency and homogeneity, and can coincide with the temporally following instant between T_consist_ok and T_omog_ok. In other words, when both the conditions of consistency and homogeneity described above are verified, then—with regard to these aspects—it is possible to identify an instant T_ok. However, at instant T_ok the other conditions described above must also have been satisfied, such as for example the fact that the first curve 21 is inside the tolerance band defined by lines 23, 24.

In all cases, the control method of the present invention is a method which can be defined as adaptive, and allows the operator to be informed at instant T_ok in which the mix has acquired the desired characteristics of consistency and homogeneity and is ready to be discharged. This advantageously allows to optimize the duration of the mixing cycles, reducing them to the minimum necessary, so as to save time, and at the same time avoiding long and laborious corrective operations, to be carried out afterward, if the mix is not ready at the discharge instant Ts predetermined for that particular recipe.

According to embodiments provided here, the control method according to the present invention provides a control step in which the operator, by means of the programmable logic controller 14, can actuate one or more operations based on the outcome of the processing step, that is, based on the information that the control and command unit 15 has sent to the programmable logic controller 14.

According to some embodiments, the operations actuated in the control step can comprise, for example, the modification of the speed of rotation of the mixing shafts, acting on the drive unit 12, by means of the inverters 13 which are commanded by the programmable logic controller 14.

In a first example, during the command step the operator can start the discharge (block 40) of the mix mixed from the bottom of the mixing tank 11, once time T_ok has been reached.

In a second example, during the command step the operator can slow down the rotation of the rotatable mixing shafts inside the mixing tank 11, if time T_ok has been reached, but it is not possible to proceed with the discharge step, for example because the hopper into which the mix is discharged is not ready to receive it (block 41). In this way, the mixing shafts keep the mix adequately amalgamated until it is possible to discharge it from the mixing tank, at the same time reducing wear due to rotation at reduced speed.

Another example in which, in the command step, it is provided to slow down the mixing shafts can occur when the power limit value is reached, for example due to an excessive load introduced into the mixing tank. In this way, it is possible to prevent the drive unit 12 from overheating and possibly being damaged.

Other examples of interventions commanded by the operator in the command step can be the complete stoppage of the drive unit, for example to make necessary and non-postponable maintenance or cleaning operations on the mixing tank 11, or for example to introduce further quantities of one or more components of the "recipe" in order to correct it in a "dynamic" manner on the basis of information that has emerged during the processing step, or again to discharge a part of the amount of excess material introduced into the mixing tank 11.

In one embodiment, the control method according to the present invention provides to not introduce a "model" load curve relating to a determinate "recipe" among the input data. This can happen especially when the mixer 10 has to mix a "recipe" that it has never treated before. In this case, the control method according to the present invention provides to carry out the steps described above, in which all the verifications and comparisons of the processing step are carried out with standard reference values established by an algorithm. In one embodiment, given by way of example, these values can be initialized to standard reference values, or they can be initialized to the values used for "recipes" similar to the one being worked.

In this embodiment, the control method according to the present invention provides that the first mixing cycle of the new "recipe" is a set-up or calibration cycle, during which all the measurements and processing carried out will also be used to define the comparison thresholds and/or the shape of the above lines, which will be adopted by the control and command unit 15 for all the following mixing cycles in which the same recipe is worked.

According to embodiments provided here, the control method according to the present invention can provide a self-learning step, exploiting machine learning techniques of a type known in the state of the art, developed in the field of artificial intelligence algorithms that are increasingly spreading also in many industrial applications. According to these embodiments, the subsequent mixing cycles of the same "recipe" already worked are adapted to what happened in the previous mixing cycle. In other words, according to these embodiments, the control method according to the present invention "self-learns", for example by modifying the different threshold values described above, and/or the shape of the lines 23, 24. By way of non-restrictive example, the threshold values considered in a subsequent cycle can be taken to be very close to the optimal values that were found in the previous cycle, just as the shape of the lines 23, 24 can be modified in conformity with the curves 21, 22 that are a function of the values calculated in the previous mixing cycle of the same "recipe".

According to embodiments provided here, the mixer 10 can be provided with sensors of temperature and relative humidity, able to detect respectively both the ambient temperature and relative humidity (that is, outside the mixing tank 11), and also inside the mixing tank 11. In this case, the control and command unit 15 can carry out the control method according to the present invention, taking into account the environmental conditions detected. By way of non-restrictive example, according to some embodiments, the lines 23, 24 can for example be redefined in a "dynamic" manner, in particular by suitably modifying the Cartesian coordinates (T, Pa) of the discontinuity points of the broken lines, based on the values of temperature and relative humidity that are detected during the execution of the mixing cycle.

According to embodiments provided here, a plurality of devices for measuring deformation are installed in the mixing tank 11, for example strain gauges of the type known in the state of the art, suitably located and oriented in particular in the most stressed zones. In these embodiments, the control and command unit 15 receives the data detected by the strain gauges and communicates them to the programmable logic controller 14. If the data detected by the strain gauges reveal significant deformations, which can be due for example to impacts or malfunctions, the command step can provide to take suitable corrective actions. For example, the operator can act on the drive unit 12 to slow down the rotation of the mixing shafts, and can even possibly stop them completely, so as to ascertain the possible causes of the malfunction, or until the strain gauges return to detect deformation values inside the limits provided. According to these embodiments, it is provided to introduce the above limits as well among the input data, beyond which the control and command unit 15 sends an anomaly signal to the programmable logic controller 14.

It is clear that modifications and/or additions of parts or steps can be made to the mixer 10 and its control method as described heretofore, without departing from the field and scope of the present invention.

It is also clear that, although the present invention has been described with reference to some specific examples, a person of skill in the art shall certainly be able to achieve many other equivalent forms of mixer and a method to control it, having the characteristics as set forth in the claims and hence all coming within the field of protection defined thereby.

The invention claimed is:

1. A method to control a mixer for concrete, mortar, powders, dry and semi-dry granulates, cement-based mixes or similar or comparable mixes or mixtures, comprising: providing a mixer, performing an input step that communicates to a control and command unit of the mixer a plurality of input data correlated to a formulation of a mix to be treated in a mixing cycle of the mixer, performing a detection step that detects the values of an electric quantity characteristic of an electric power line of a drive unit comprised in the mixer, performing a processing step in which said control and command unit processes the values detected in the detection step in order to calculate an overall active power that is generated as a function of time and to carry out one or more verifications, comparing the values processed with one or more of the respective data introduced among the plurality of input data in order to transmit to a programmable logic controller that commands the functioning of the mixer and commands at least one of a consent signal to discharge the mix subjected to the mixing cycle or an anomaly signal selectively correlated to the verification or verifications that have had a negative outcome, and wherein the consent signal or the anomaly signal alert an operator to respectively command at least one of the discharge of the mix from the mixer or consequent corrective actions on the mixing cycle, and wherein the processing step graphically plots a first curve, a shape of which shows the average values calculated of the overall active power as a function of time, and a second curve having a shape that substantially follows the shape of the first curve but has an oscillating shape characterized by a succession of peaks and hollows, and which shows the shape of the values calculated, instant by instant, of the overall active power as a function of time and net of the average values, and further wherein the development of said first curve and of said second curve are respectively correlated to a consistency and a homogeneity of the mix subjected to the mixing cycle, and wherein the processing step compares the values of the average overall active power with a predetermined threshold value introduced among the plurality of input data, below which it is deemed that the consistency of the mix is adequate, and also calculates the distance, measured parallel to the y-axis, between each oscillation peak and the subsequent hollow, and subsequently compares the calculated distance with a predetermined distance value that functions as a threshold value introduced among the plurality of input data below which it is deemed that the homogeneity of the mix is adequate.

2. The method as in claim 1, wherein the consistency of the mix is reflected by a consistency value and the homogeneity of the mix is reflected by a homogeneity value, and wherein said control and command unit sends to the programmable logic controller the consent signal to initiate discharge of the mix as soon as both the consistency value is lower than a threshold consistency value and the homogeneity value is lower than a threshold homogeneity value.

3. The method as in claim 1, wherein the processing step verifies the conditions of a mixing tank comprised in the mixer in order to verify at least one or more of that the mixing tank is completely empty at the end of the previous mixing cycle, if said mixing tank has to be cleaned or maintained, or if the mixing tank has been loaded with an excessive amount of material.

4. The method as in claim 3, wherein said processing step it identifies the conditions of the mixing tank by comparing average values of active power calculated, in particular in determined portions of the mixing cycle, with threshold values of the power, introduced among the plurality of input data; and wherein if an average active power exceeds a threshold value, anomaly signals are communicated to the programmable logic controller to carry out the corrective cleaning or maintenance operations of the mixing tank, or to discharge the excessive amount of material.

5. The method as in claim 1, wherein the processing step compares the shape of said first curve with a reference model curve, introduced among the plurality of input data, and directly correlated to the formulation of the mix, in order to verify that it remains inside a tolerance band delimited above by a first broken line and below by a second broken line, whose shape is determined by reference coordinates introduced among the plurality of input data, and in that the processing step also verifies if after a determined instant said first curve maintains a decreasing monotonic development; wherein, if the first curve departs from said tolerance band, or does not have the decreasing monotonic development provided after said determinate determined instant, said control and command unit communicates to said programmable logic controller an anomaly signal of the mixing cycle.

6. The method as in claim 1, wherein the electric quantity detected in the detection step is chosen from a group consisting of: electric current, voltage, active power, reactive power; and in that the detection step detects the electric current by means of Hall effect sensors.

7. The method as in claim 1, wherein in the detection step the frequency of detection of the values of the electric quantity is equal to or higher than 5 Hz.

* * * * *